Figure 4:
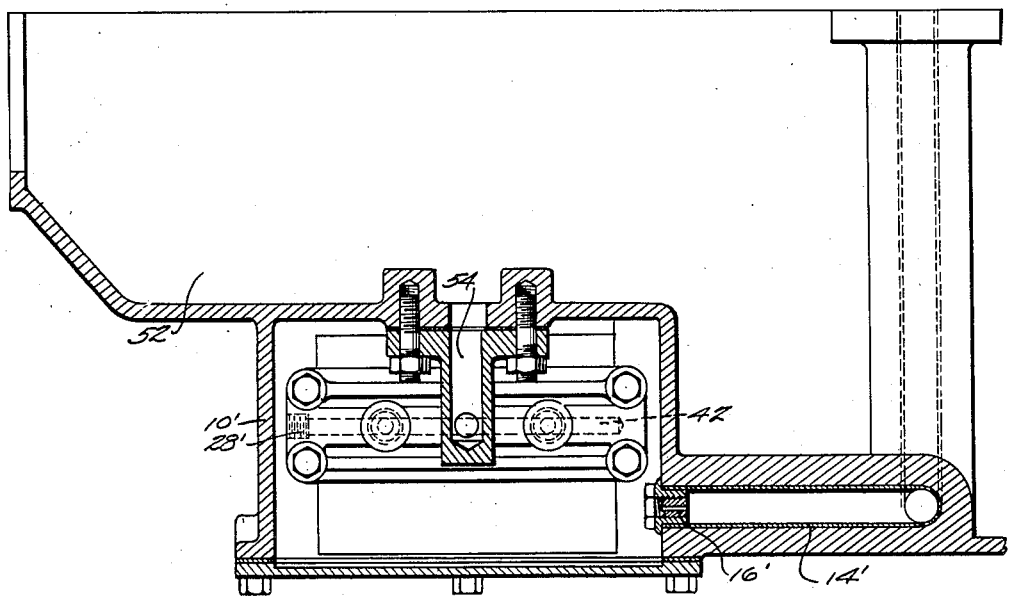

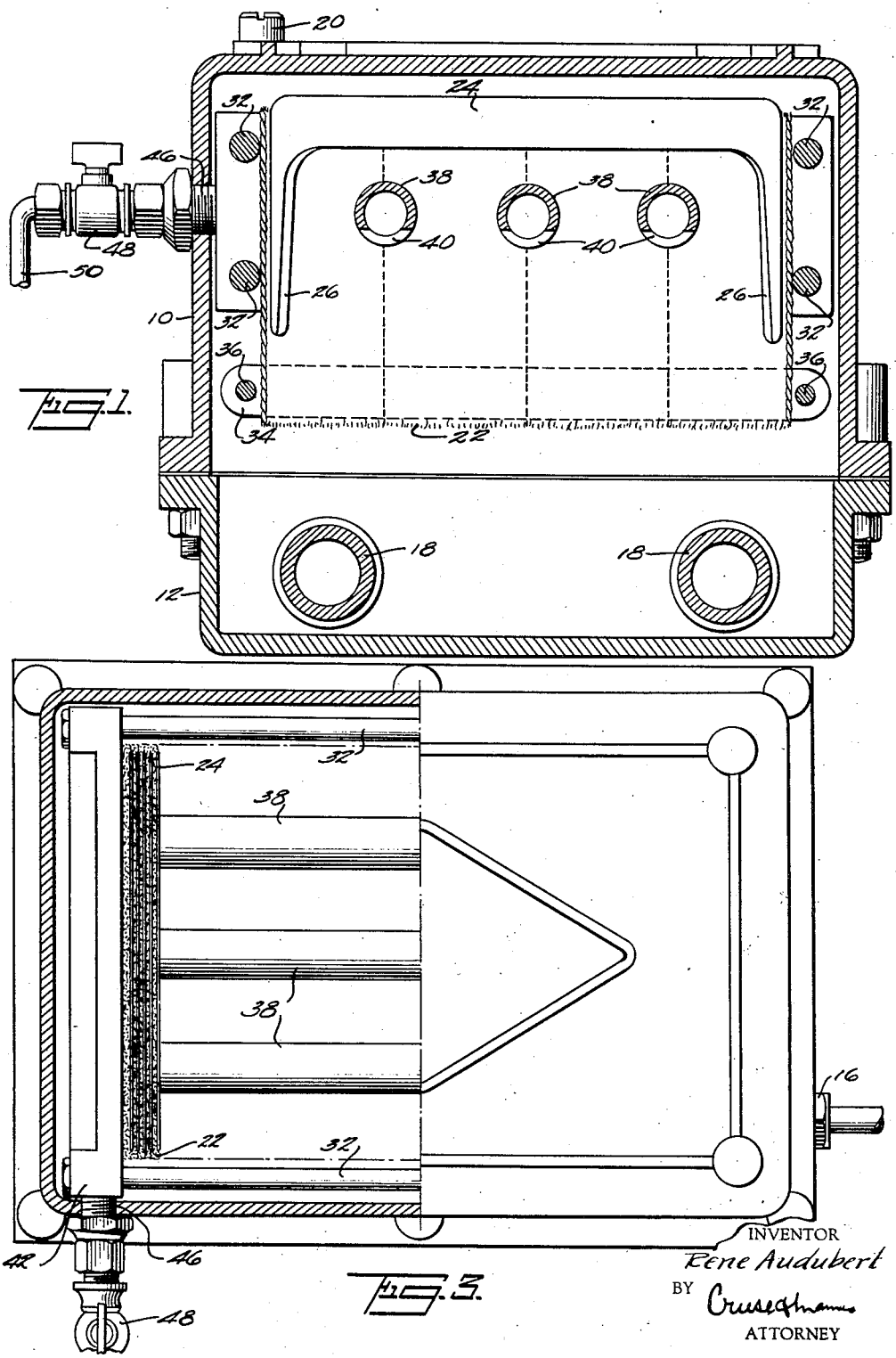

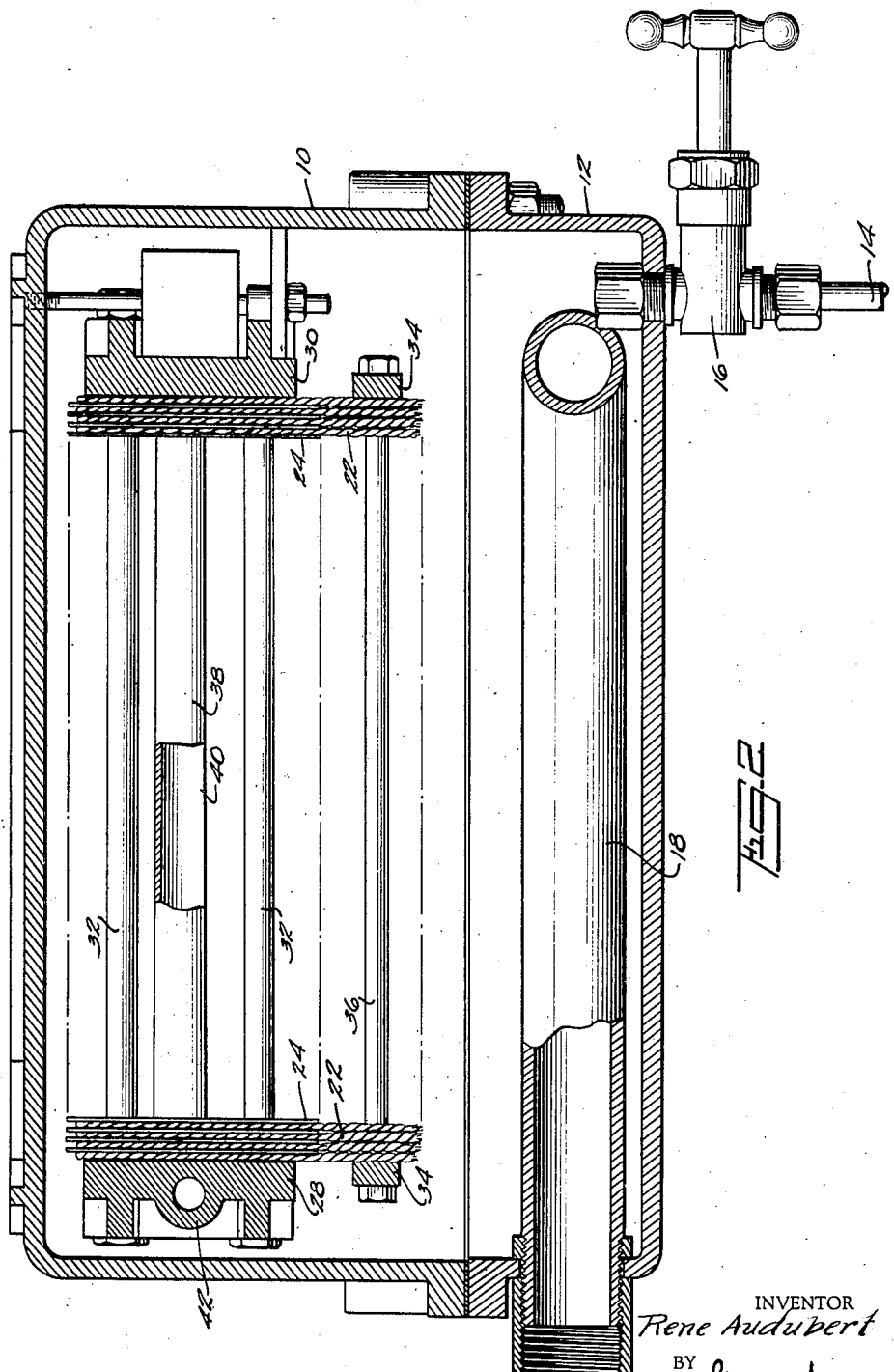

Aug. 13, 1929.  R. AUDUBERT  1,723,997
FILTERING SYSTEM
Filed March 7, 1928  3 Sheets-Sheet 3

INVENTOR
Rene Audubert
BY
ATTORNEYS

Patented Aug. 13, 1929.

1,723,997

UNITED STATES PATENT OFFICE.

RENE AUDUBERT, OF PARIS, FRANCE.

FILTERING SYSTEM.

Application filed March 7, 1928, Serial No. 259,705, and in France October 27, 1927.

The ordinary definition of a filter is a device for straining impurities out of a liquid. This gives a very accurate picture of the operation of the ordinary filter where the impurities are held back by mechanical interference. Due to the fact that the usual filter holds the impurities mechanically, pressure on the liquid does not decrease the efficiency of action and greatly increases the amount of liquid that can be put through a given filter in a given time. In most cases, the filtering medium is so coarse in comparison to the size of the impurities that when the flow first starts, the finer impurities will pass through, and a clear flow will not be had until the passages of the filter have been somewhat clogged. Thus there is a steady increase in efficiency as regards completeness of removal but this is necessarily accompanied by a steady falling off in efficiency as regards amount of liquid which passes through.

I have discovered that by utilizing the electric phenomena which occur in small tubes it is possible to construct a filter which will give a substantial commercial flow, will give as complete removal of impurities from the first drop that passes through as from the later part of the flow and will not become blocked inside the passages, so that if the impurities collect on the face of the filter and impede the flow of liquid to the filter, a surface scraping will restore approximately the original conditions.

It is known that there is usually a difference of potential between two heterogeneous phases. Whatever be the theory of this phenomenon, it results in electric attraction and repulsion actions which can be utilized for the separation from a liquid of material of different phase. I have found that to obtain efficient filtering action from a tube of a diameter greater than that of the particles to be removed, a balance must be maintained between the diameter of the tube, the field of electric actions at the inner surface and the static head on the liquid to be filtered, which is of importance as affecting the speed of flow through the tube.

As regards the diameter of the tube, the limiting factor is that the tube must be such that its radius is no greater than the effective field of the electric action referred to above. Thus a capillary tube may be used, or the tube may be of greater diameter, provided there is a sufficient electric field. When the conditions stated are met, the electric fields in the tubes will exercise a selective action between the liquid and the matter held in suspension. As to such suspended matter, the electric action may be either one of attraction or repulsion. In the former case, the charge of the tube wall will attract the globules or particles of the impurity which may form a thin covering on the inner wall of the tube, but this will occur principally near the base. As these particles will not lose their charge they will of course have the same charge as the other similar particles so that instead of an attraction, there will be a repulsion which will hinder further entrance of particles into the tube and prevent close agglomeration; there is thus formed on the face of the filter a felted layer of the impurities which does not repel or materially interfere with flow of the liquid. At the same time, since this layer has the same sign as the dispersed impurities it appears to repel them more and more as the thickness of the layer increases, and thus the layer will tend to build up very gradually and eventually will reach a point of substantial equilibrium. Of course the compactness of this layer will be less where gravity is working against its formation.

Where the tube wall and the impurities both have the same sign a like action will start at once without the necessity of having particles of the impurities collect around the entrance to the tube in order to cause repulsion to exist. In this case, there is also a further factor tending to assist in the desired separation. When a liquid passes slowly into a tube, the walls of which carry an electrical charge having an effective field over the cross sectional area of the tube, there is a measurable difference in potential between different portions of the liquid in the tube, and the portion near the entrance to the tube will have a like sign to the tube walls. In other words, the ions with the opposite sign to the tube walls are drawn into the tube, and the ions with the same sign remain near the entrance, thus creating a polarized field of increasing intensity which will tend to repel impurities of like sign from the entrance to the tube. This is particularly important when the tube walls have the same sign as the impurities, for where this is the case, if an impurity once enters the tube, it will not be removed by the attraction of the walls but may be carried through. Accordingly, while I prefer to build my filter so that the passage of impurities will be substantially stopped right from the start, still the factors just discussed may render it possible to construct a filter embodying my invention, which may momentarily permit some impurities to pass and then increase in efficiency.

If the tube walls have the opposite sign to the impurities, there is less danger of impurities being carried through, but here a similar phenomena may occur adjacent the loose layer of impurities that will collect on the face of the filter, which will be a factor in reaching the equilibrium referred to.

Under some circumstances as for example where the impurities have a natural tendency to coalesce and form a more or less impervious layer, it may be desirable to take steps to give to the wall of the tube a definite electric charge of like sign to that of the impurities, by utilizing factors recognized under the known laws of the electric forces of adsorption. A practical method of giving a desired charge is by impregnating the filtering material. Thus one may give to the surface of the filtering material a positive charge by the use of any of the acids, particularly phosphoric acid. In this case the hydrogen ions are employed to create a positive charge. In addition, polyvalent cations such as cerium, or lanthanum or other similar materials may be used.

To provide a negative charge, all bases may be employed, in which case the hydroxyl ions serve to create the negative charge on the filter. Also polyvalent anions such for example as ferro-cyanide ($FeC_6N_6$) may be used.

Thus far, the discussion has not taken into account the question of velocity of the liquid in the tube. It must be borne in mind that the electrostatic forces that have been referred to may be quite minute near the centre of the tube, particularly where the radius of the tube is approximately equal to the effective field of the electric action of its walls, and therefore unless the velocity of the liquid is kept down to a minimum such action will be upset and the impurities will be swept through, unless of course an ordinary mechanical straining effect is built up which may be effective for a short time, after which the filter will clog. From this it follows that the velocity must be low enough, taking into account the length and diameter of the tubes and the electric charges, so that impurities will not be swept through without being acted upon by the charge. The evidences of correct conditions are that the liquid will be purified right from the start, and after the filter has been in operation some time it will come to a substantial equilibrium beyond which point its flow will not be materially reduced by the collection of the layer of impurities against the face of the filter. This point will usually be reached after a relatively long operation and if one desires to clean the filter before the rate of flow drops to this point of equilibrium it is simply necessary to scrape away the relatively loose material on the surface, for no substantial amount will be found choking the pores on the inside. The best effect is obtained by having the force of gravity working against the flow of the liquid, as this will help to keep the impurities from entering, or settling on and packing against the tubes.

From this discussion it will be noted that one of the outstanding features of my filter is that the liquid passages are sufficiently large so that from a mechanical point of view impurities can pass through the openings, but because of the operations being conducted at low velocities, the electrical forces are permitted to act to prevent such passage. Thus while a very low velocity is maintained through the filter it must be remembered that the size of the passages remains relatively large and thus an efficient rate of flow can be maintained. If undue pressure is utilized with a filter intended for operation according to my method, then the device will function in the old and well-known way, namely, impurities will come through until the passages are partially choked, then there will be a relatively short period of efficient action until the pores become blocked to the point where the flow is reduced below the point of practical yield.

In operation, I have found that efficient results can be obtained as for example in filtering transformer oil at a temperature of 50° C. by using fabric woven like an ordinary lamp wick but only about 5 centimeters long, through which the liquid rises, and maintaining a pressure differential only barely sufficient to cause a flow to take place. Such pressure differential may be in the order of a pressure equivalent to a static head of from 5 to 100 centimeters of water, but it is understood that these figures are given rather by way of illustration than in limitation and that it is the velocity rather than the pressure which is important so that the viscosity of the liquid must be considered; further the permissible velocity will vary with the size of the tubes and the force of their electrostatic charge.

The simplest way to maintain the desired pressure differential is to arrange the tubes in a casing which will permit the lower ends to contact with the oil but will prevent the entrance of air or liquid to the upper portion so that the entrance can only take place through the tubes. The filtered material is collected from the upper portion of such casing. When such a casing is provided, the pressure differential may readily be obtained in various ways such as maintaining the top level of the liquid to be filtered, above the top of the tubes, or by slightly reducing the pressure in the top of the casing by suction. The necessary suction can be had, for example, by allowing the filtered material to flow out and down through a short pipe so that in effect a syphon is obtained in which the tubes serve as the short leg, and the down pipe as the longer leg; the filter may then be put quickly in operation by temporarily applying outside suction to start the flow.

In view of the low pressure differential used, it is highly desirable that the tubes be of the same length, for inasmuch as the tubes must be quite small, internal friction will be a factor of importance and if the tubes are of substantially different length a pressure which will cause any substantial flow through the longer tubes may create too great a velocity in the shorter tubes.

The word "tubes" as here used is intended to give a visualization of the phenomena which take place; and it is not to be understood that a group of distinct, continuous tubes must be used. On the contrary, any porous material can be utilized provided the pores or passages meet the requirements described as applying to tubes and with porous material the surface is very great, so that the effects of the electrical adsorption phenomena are strengthened. With porous material, it is important that the pores or passages be maintained of uniform size, for a substantial difference in size of the passages will cause the large tubes to permit a greater velocity and at the same time there will be larger space to be covered by the electric field. Further, with porous material, arrangement should be made so that the force of gravity is about equal on all parts of the filter, that is, the flow should be approximately vertical rather than horizontal.

Figure 5:
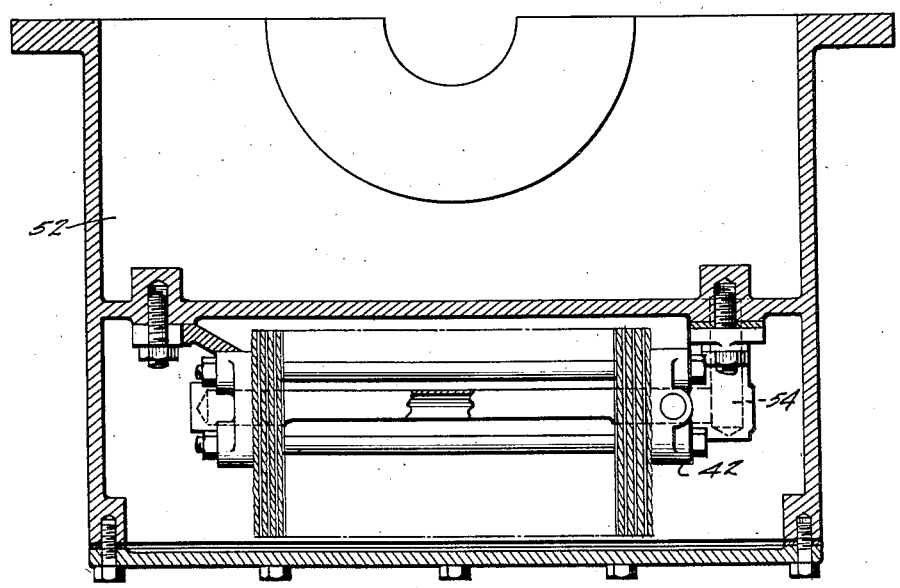

An apparatus illustrating the foregoing principles, which I have found particularly efficient, is shown in the accompanying drawings. In these drawings, Fig. 1 is a transverse section, Fig. 2 a longitudinal section, and Fig. 3 a plan view (with a portion of the top plate broken away) of one form of such an apparatus; and Figs. 4 and 5 are respectively a longitudinal and transverse section showing a similar apparatus built into the crankcase of an automobile.

In Figs. 1 to 3, the numeral 10 designates an enclosure having a removable bottom portion 12 into which oil is adapted to be introduced under pressure through a pipe 14. The pipe 14 is provided with an adjustable reducing valve 16 whereby the pressure of the liquid can be maintained substantially constant. This apparatus is primarily intended for treating oil, and in order to maintain heavy grades of oil in a fluid condition, the enclosure is provided with a heating pipe 18 through which a heating medium may be passed; for example, if the device is used in an automobile, the pipe 18 may be connected with the exhaust of the engine or with the water jacket of the engine. The enclosure 10 is provided with a screw 20 so that entrapped air may be permitted to escape.

The filter proper is here shown as made up of a number of layers of fabric woven in a manner similar to lamp wick, indicated at 22. Between these layers of fabric are U-shaped plates 24 which preferably taper off to a knife edge as shown at 26, so that there will be no open passages at the edges of these plates. The plates and fabric are pressed firmly together between end plates 28 and 30, which are connected by bolts 32. It will be noted that when the bolts 32 are tightened up, the top and sides of the mass will be compressed so that they are substantially air-tight, but the part of the fabric which does not contact with the plate 24 will be pressed only sufficiently to form approximately uniform passages through it. At the bottom edge the layers of fabric are given some pressure between bars 34 which are connected together by bolts 36. The bolts 36 are tightened up only to such point that solid material will not readily go between the different layers of wicking and so that the area of uniform passages will be continued down to the bottom. Between the end plates 28 and 30 run a series of collection pipes 38 which are open at the bottom as indicated at 40. These pipes connect with a header pipe 42 in end plate 28. An outlet pipe 46 is connected to the header 42 and may be supplied with a valve 48 from which runs the pipe 50.

In operation, the enclosure 10 is filled with the liquid to be cleaned, and entrapped air is allowed to escape by loosening screw 20. Reducing valve 16 maintains the liquid in the enclosure 10 at a pressure slightly above atmospheric. The passages in the fabric 22 will permit the liquid to flow through but will not permit the impurities to pass, because of the electric charge, as already has been explained. As the liquid rises in the fabric (due to capillary action) it will flow towards the pipes 38, for the pressure in these pipes is slightly lower than the pressure on the liquid. However, this flow should be maintained at very low velocity for the reasons previously set forth. The liquid that is collected in pipes 38 will pass into the header pipe 42 and thence out through pipe 50.

If the pipe 50 were extended down a short distance below the casing 10, it would not be necessary to maintain any pressure on the liquid in the casing 10, for the downward flow in the pipe 50 would exert sufficient suction to cause the desired movement in the tubes to take place.

In this structure it will be noted that due to the compression, the edges of the fabric and the plates 24 form a substantial casing around the top and sides of the wicks.

Similar apparatus is illustrated in Figs. 4 and 5, except that instead of the casing 10, a casing 10′ is formed integral with the automobile crankcase 52. A portion of the oil from the usual oil pump enters through pipe 14′ and reducing valve 16′. The end plate 28′ provided with the header pipe 42′ is here connected with a vertical pipe 54 which discharges upwardly into the crankcase 52.

Some of the benefits obtainable by the use of the system described are shown from the following examples:

Crankcase oil which had been used in an automobile was dissolved in ether and carefully filtered by standard laboratory methods and was found to contain 4.8% of solids by weight. These solids represented impurities, as the corresponding grade of oil before use was found to contain .02% of solids on a similar test. A portion of the used oil was filtered in a standard type of filter such as is used on automobiles, and after passing through such filter was found still to contain 3.7% of solids. Another portion of the same oil was filtered by the system of this application and was found to contain only .08% solids. In other words, one filtration by this system restored the oil substantially to its original purity as regards suspended matter.

In another case transformer oil was subjected to a standard breakdown test. It was found that sparks commenced to pass through the oil at a tension of 6,000 volts and an arc was formed at 37,000 volts. After a different portion of the same oil had been passed through a filter according to this system, a tension of approximately 75,000 volts was necessary to start any sparking and the voltage was carried above 75,000 without an arc being formed. In this test, evidence is given both of the removal of solid impurities and also of suspended liquid impurities such as water, which will be in a different phase from the oil, and therefore separable by the action of the electrostatic charges. In other words, I use the expression "different phase" to cover all cases of two immiscible bodies.

It is to be understood that while I refer to the suspended or dispersed material as an impurity, it may be that this will be the more valuable component of the mixture, and for the recovery of such dispersed matter my filter is particularly efficient, due to the fact that only small quantities will remain in the pores, avoiding the difficulty of the usual filter where the material which clogs the pores is ordinarily wasted. It is obvious that many other applications of such filtering devices, besides those described in the examples, can be made in various arts, and the size and proportion of the mechanical parts may be greatly modified, provided that the pressure is properly balanced to the electric charge of the tubes, as has been pointed out.

It may further be pointed out that while I may use as a filtering material a substance having passages of capillary size, still the capillary action which tends to make a liquid rise in a tube is not relied upon and may be disregarded, as the liquid is preferably caused to pass through the filtering material by maintaining a lower pressure at the discharge end than at the intake end.

What I claim is:

1. A filtering apparatus comprising a mass of filtering material having minute capillary passages, means for contacting such mass of filtering material with the liquid to be purified, means for withdrawing liquid from such mass, and means for maintaining a pressure differential between the inlet and discharge points which is of the order of from 5 to 100 centimeters of water whereby the liquid is forced through the filtering material but at a velocity sufficiently low to permit the electrical surface charges to act to substantially prevent the passage of impurities through the mass.

2. A filter comprising a mass of filtering material of substantial thickness in the direction of flow having passages through it larger than impurities to be removed, but substantially free of passages so large as to permit such impurities to pass through when a liquid containing such impurities is caused to flow through the filtering material under a relatively low pressure such as a pressure substantially lower than 100 centimeters of water, means for contacting such mass of filtering material with the liquid to be purified, means for withdrawing liquid from such mass, and means for maintaining a pressure differential between the inlet and discharge points which is of the order of from 5 to 100 centimeters of water whereby the liquid is forced through the filtering material but at a velocity sufficiently low to permit the electrical surface charges to act to substantially prevent the passage of impurities through the mass.

3. A filter comprising a mass of compacted filtering material having passages through it of small capillary size but sufficiently large so that impurities to be removed would be carried through by the fluid to be purified if the fluid were forced through by a relatively high pressure such as a pressure substantially higher than 100 centimeters of water, and substantially free of passages so large as to permit such impurities to pass through when a liquid containing such impurities is caused to flow through the filtering material under a relatively low pressure such as a pressure substantially lower than 100 centimeters of water, means for contacting such mass of filtering material with the liquid to be purified, means for withdrawing liquid from such mass, and means for maintaining a pressure differential between the inlet and discharge points which is of the order of from 5 to 100 centimeters of water whereby the liquid is forced through the filtering material but at a velocity sufficiently low to permit the electrical surface charges to act to substantially prevent the passage of impurities through the mass.

4. A filter for purifying a fluid containing impurities of different phase, which comprises a mass of porous material having passages of small capillary size but sufficiently large so that such impurities would be carried through by such fluid if the fluid were forced through by a relatively high pressure such as a pressure substantially higher than 100 centimeters of water, means for contacting one face of such material with the fluid to be purified, means for withdrawing the purified fluid from such mass, and means for maintaining a relatively low pressure differential between the inlet and discharge points of the order of a pressure differential of from 5 to 100 centimeters of water, whereby the fluid is caused to flow through the passages in the mass but at a velocity sufficiently low to permit the electrical surface charges to act to substantially prevent the passage of such impurities through the mass.

5. A filtering apparatus comprising a mass of compacted filtering material substantially free of passages sufficiently large to permit minute impurities to pass therethrough when a liquid containing such impurities is moved through such passages at a very low rate of velocity such as a velocity of the order of a flow caused by capillary attraction, but containing passages sufficiently large to permit substantial amounts of such impurities to pass when such liquid is moved through at a high velocity, such as a velocity resulting from a pressure differential substantially in excess of 100 centimeters of water, means for contacting one face of such mass of filtering material with a liquid to be purified, means for withdrawing liquid from such mass without having the liquid undergo a substantial change in direction of movement while within the mass, and means for maintaining a pressure differential between the inlet and discharge points of the order of from 5 to 100 centimenters of water.

6. A structure as specified in claim 5, in which the filtering material is compacted at the inlet side so as largely to prevent solid material from entering the mass of filtering material.

7. In combination, layers of wick-like fabric with the absorptive threads running substantially in one direction, means for holding such layers firmly together, a casing for one end of such layers extending over the sides thereof, means for exposing the open end of such layers to a liquid to be filtered and means for withdrawing liquid from within such casing and means for maintaining a pressure differential between the inlet and the discharge point within such casing which is of the order of from 5 to 100 centimeters of water.

8. A structure as specified in claim 7, in which such casing is formed by compressing U-shaped plates between layers of the fabric with sufficient pressure so that the fabric directly between such plates is substantially impermeable.

RENE AUDUBERT.